(12) United States Patent
Lee

(10) Patent No.: US 7,714,930 B2
(45) Date of Patent: May 11, 2010

(54) CONTROL METHOD FOR DIGITAL PHOTOGRAPHING APPARATUS FOR EFFICIENT SETTING OPERATION AND DIGITAL PHOTOGRAPHING APPARATUS USING THE METHOD

(75) Inventor: Seung-yun Lee, Seongnam-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 1221 days.

(21) Appl. No.: 11/029,189

(22) Filed: Jan. 4, 2005

(65) Prior Publication Data

US 2006/0044400 A1    Mar. 2, 2006

(30) Foreign Application Priority Data

Aug. 25, 2004   (KR) ...................... 10-2004-0067085

(51) Int. Cl.
H04N 5/232 (2006.01)
G03B 17/18 (2006.01)

(52) U.S. Cl. ........................ 348/371; 396/201
(58) Field of Classification Search ................. 348/220, 348/333, 370, 371, 207.99; 710/14; 396/155, 396/201, 297, 299
See application file for complete search history.

(56) References Cited

U.S. PATENT DOCUMENTS

| | | | | |
|---|---|---|---|---|
| 4,450,487 A | * | 5/1984 | Koide | 348/211.1 |
| 4,939,601 A | * | 7/1990 | Endo et al. | 360/137 |
| 5,298,936 A | * | 3/1994 | Akitake et al. | 396/85 |
| 5,465,133 A | * | 11/1995 | Aoki et al. | 348/363 |
| 5,541,656 A | * | 7/1996 | Kare et al. | 348/333.02 |
| 5,682,559 A | * | 10/1997 | Yoshino et al. | 396/121 |
| 6,029,012 A | * | 2/2000 | Miyamoto et al. | 396/158 |
| 6,072,535 A | * | 6/2000 | Kearns | 348/563 |
| 6,362,851 B1 | * | 3/2002 | Lavelle et al. | 348/333.01 |
| 6,441,854 B2 | * | 8/2002 | Fellegara et al. | 348/333.13 |
| 6,456,338 B1 | * | 9/2002 | Yuen | 348/731 |
| 6,571,066 B1 | * | 5/2003 | Tsai | 396/299 |
| 6,614,996 B2 | * | 9/2003 | Okisu et al. | 348/333.02 |

(Continued)

OTHER PUBLICATIONS

Author: Meade Instruments Corporation Title: Operating Instructions Meade®8×22 VGA CaptureView Integrated Binocular and Digital Camera Date: Oct. 20, 2003 URL:http://www.meade.com/manuals/TelescopeManuals/CaptureView/Meade%20CVB1003%208x22%20090903.pdf, Filename: Meade DBI InstMnl 090903.*

*Primary Examiner*—Jason Whipkey
(74) *Attorney, Agent, or Firm*—Drinker Biddle & Reath LLP

(57) ABSTRACT

A control method for a digital photographing apparatus is provided in which one of operating modes associated with a button is set according to the length of time the button is pressed and a digital photographing apparatus using the method. The method includes setting a next operating mode in a forward direction if a first setting signal is generated by pressing the button and setting a next operating mode in a reverse direction if a second setting signal including the first setting signal is generated by pressing the button. Also, a system for controlling the operation of a digital photographing apparatus is provided. The system includes means for a digital photographing apparatus to operate in at least two selectable operating modes, means for showing the available operating modes in both a forward and reverse direction and means for selecting one of the operating modes.

19 Claims, 11 Drawing Sheets

U.S. PATENT DOCUMENTS

| | | | |
|---|---|---|---|
| 6,707,490 B1 * | 3/2004 | Kido et al. | 348/373 |
| 6,801,718 B2 * | 10/2004 | Umetsu et al. | 396/287 |
| 6,963,359 B1 * | 11/2005 | Aosaki et al. | 348/333.01 |
| 2001/0014214 A1 | 8/2001 | Hayashi et al. | |
| 2004/0119876 A1 | 6/2004 | Ohmori et al. | |
| 2004/0141080 A1 * | 7/2004 | Battles | 348/333.01 |
| 2004/0179131 A1 * | 9/2004 | Honda et al. | 348/362 |

* cited by examiner

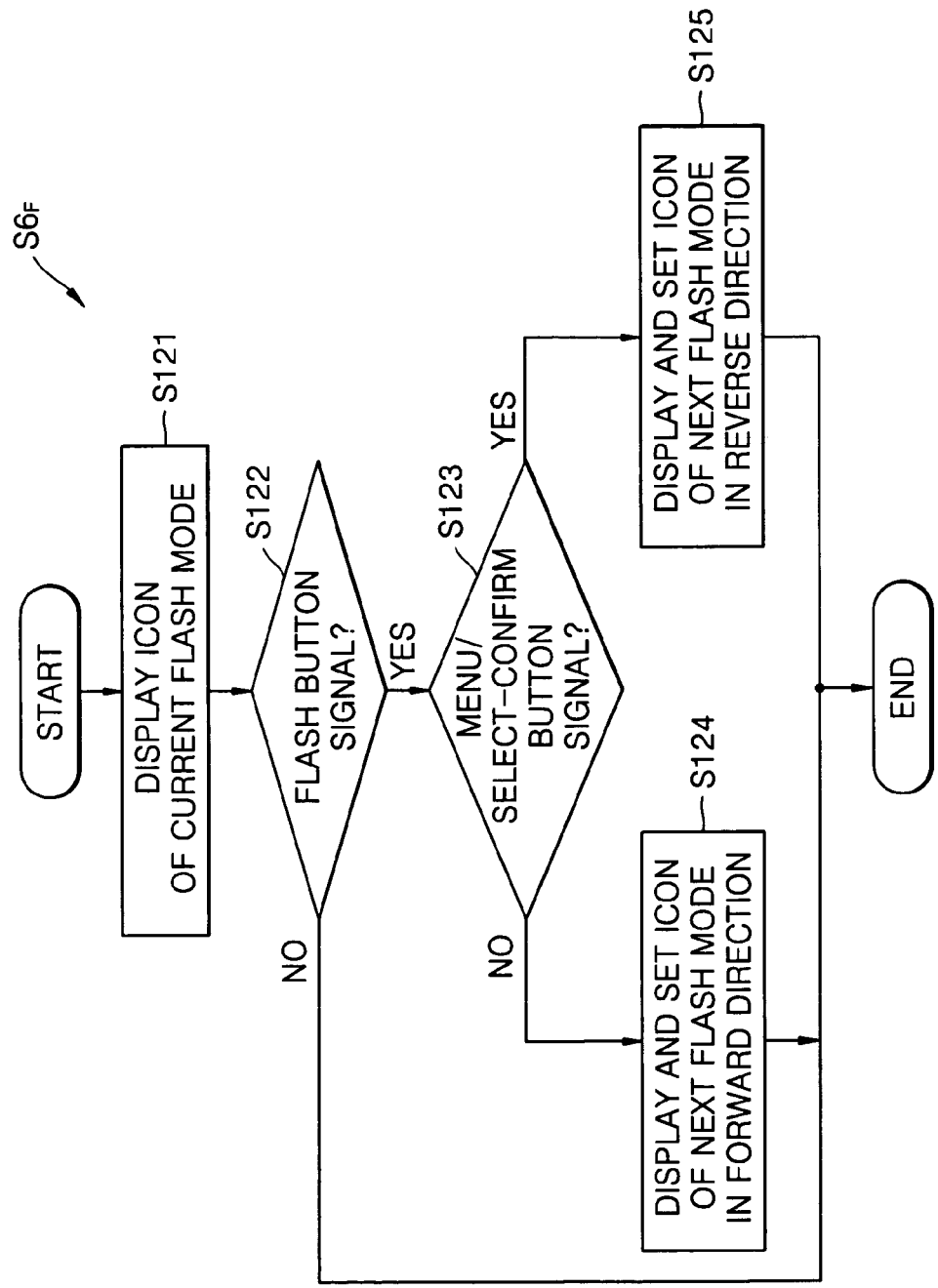

CONTROL METHOD FOR DIGITAL PHOTOGRAPHING APPARATUS FOR EFFICIENT SETTING OPERATION AND DIGITAL PHOTOGRAPHING APPARATUS USING THE METHOD

This application claims the priority of Korean Patent Application No. 2004-67085, filed on Aug. 25, 2004, in the Korean Intellectual Property Office, the disclosure of which is incorporated herein in its entirety by reference.

BACKGROUND OF THE INVENTION

1. Field of the Invention

The present invention relates to a control method for a digital photographing apparatus, a digital photographing apparatus using the method, and a system for controlling the operation of a digital photographing apparatus. More particularly, the present invention relates to a control method for a digital photographing apparatus in which one of the operating modes associated with a button is set according to operation of the button, a digital photographing apparatus using the method, and a system for setting the operating mode of a digital photographing apparatus.

2. Description of the Related Art

A conventional digital photographing apparatus was disclosed by the present applicant in U.S. Patent Publication No. 119,876, "Method of Notification of Inadequate Picture Quality." In this disclosed apparatus, one of the operating modes associated with a button, for example, a flash button, is set according to the number of times that the button is pressed. Generally, whenever the button is pressed, a next operating mode in a forward direction is displayed and set. Therefore, if the user mistakenly skips a desired operating mode, the user has to press the button as many times as the number of operating modes in order to return to the desired operating mode.

SUMMARY OF THE INVENTION

The present invention provides a control method for a digital photographing apparatus. The control method herein described enables a user to set an operating mode quickly and easily. The present invention also provides a digital photographing apparatus which employs the method.

According to an aspect of the present invention, there is provided a control method for a digital photographing apparatus in which one of the operating modes associated with a button is set according to the number of times the button is pressed. The method includes (1) setting a next operating mode in a forward direction if a first setting signal is generated by pressing the button and (2) setting a next operating mode in a reverse direction if a second setting signal including the first setting signal is generated by pressing the button.

In the method, a user may set a next operating mode in a forward or reverse direction using the button. Therefore, even if the user mistakenly skips a desired flash mode, the desired flash mode can be set quickly and easily by pressing the button.

According to another aspect of the present invention, there is provided a digital photographing apparatus using the control method.

BRIEF DESCRIPTION OF THE DRAWINGS

The above and other features and advantages of the present invention will become more apparent by describing in detail exemplary embodiments thereof with reference to the attached drawings in which:

FIG. 12 is a flowchart illustrating a flash-mode setting algorithm when the flash/left button is pressed in S5 of FIG. 4 according to another embodiment of the present invention.

DETAILED DESCRIPTION OF THE INVENTION

Figure 1:
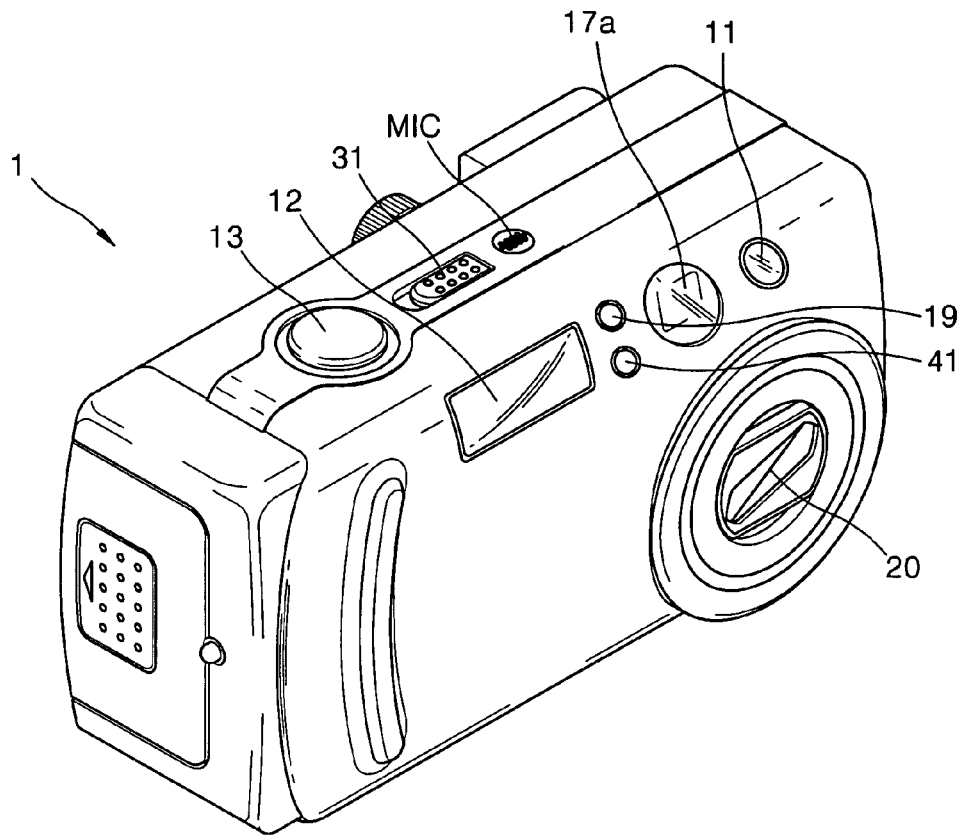
FIG. 1 is a perspective view showing the front and the top of a digital photographing apparatus according to the present invention.

Referring to FIG. 1, the front part of a digital camera 1 according to the present invention includes a microphone MIC, a self-timer lamp 11, a flash 12, a shutter release button 13, a viewfinder 17a, a flash light intensity sensor 19, a power switch 31, a lens unit 20, and a remote receiver 41.

In a self-timer mode, the self-timer lamp 11 operates for a set period of time from the time when the shutter release button 13 is pressed to the time when an image starts to be captured. When the flash 12 operates, the flash light intensity sensor 19 senses the intensity of the light generated by the flash 12 and relays the sensed intensity of the light to a digital signal processor (DSP) 507 of FIG. 3 via a micro-controller 512 of FIG. 3. The remote receiver 41 receives command signals, such as a photographing command signal, and relays the command signals to the micro-controller 512.

The shutter release button 13 has two levels. In other words, after operating a wide angle-zoom button $39_W$ of FIG. 2 and a telephoto-zoom button $39_T$ of FIG. 2, when a user lightly depresses the shutter release button 13 to a first level, a first level signal S1 from the shutter release button 13 is turned on. When the user fully depresses the shutter release button 13 to a second level, a second level signal S2 of the shutter release button 13 is turned on (see FIGS. 4, 6 and 7).

Figure 2:
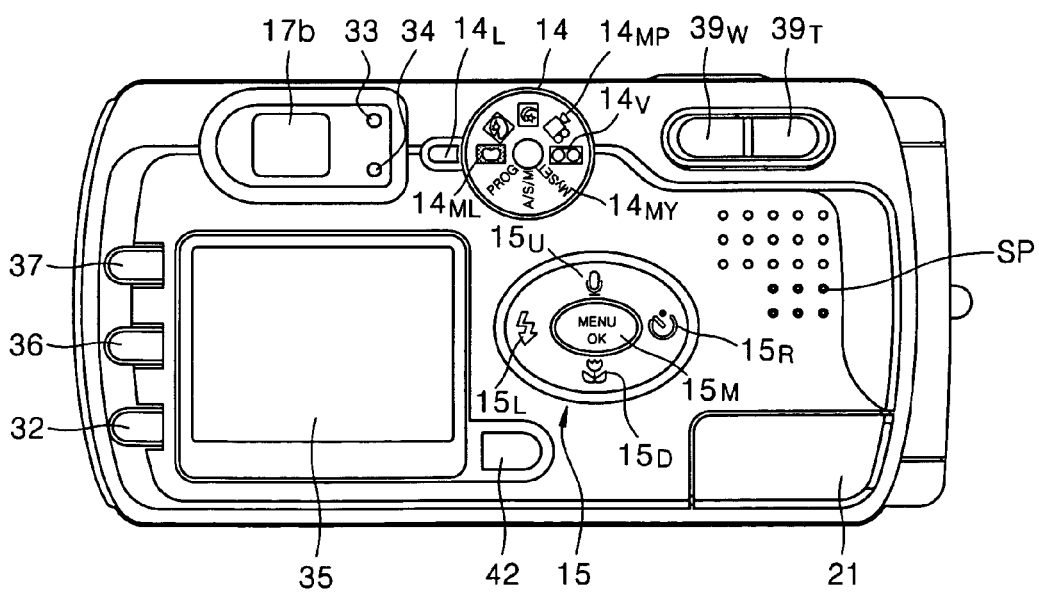
FIG. 2 is a back view showing the back of the digital photographing apparatus of FIG. 1.

Referring to FIG. 2, the back of the digital camera 1 according to the present invention includes a mode dial 14, functional buttons 15, a manual focusing/deleting button 36, a manual adjusting/reproducing/terminating button 37, a reproducing mode button 42, a speaker SP, a monitor button 32, an automatic focusing lamp 33, a viewfinder 17b, a flash standby lamp 34, a color LCD panel 35, the wide angle-zoom button $39_W$, the telephoto-zoom button $39_T$, and an external interface unit 21.

The mode dial 14 is used for selecting any one of the operating modes of the digital camera 1. Exemplary operating modes include the following: a simple photographing mode, a program photographing mode, a character photographing mode, a night view photographing mode, a manual photographing mode, a moving-image photographing mode $14_{MP}$, a user setting mode $14_{MY}$, and a recording mode $14_V$.

The user setting mode $14_{MY}$ is an operating mode in which the user selects the photograph-taking settings for a still-image or moving-image photographing mode. The recording mode $14_V$ is for recording only sounds, e.g., a user's voice. After selecting the recording mode $14_V$, when a user presses the shutter release button, an audio file is created in the memory card and audio data is stored in the audio file. When the user presses the shutter release button 13 again, the audio data stops being stored and the audio file is set.

The functional buttons 15 are used for operating specific functions of the digital camera 1, and the functional buttons 15 are also used as control buttons to manage the movement of an active cursor on the menu screen of the color LCD panel 35. For example, in a reproducing mode, if an image currently displayed is not enlarged, when a user presses a self-timer/right button $15_R$, a next file in a forward direction is displayed. If an image currently displayed is enlarged, when the user presses the self-timer/right button $15_R$, a display region of the enlarged image is moved to the right. In a preview mode, if the user presses the self-timer/right button $15_R$, a self-timer operation, e.g., automatic photographing after 10 seconds, is performed.

In the reproducing mode, if the image currently displayed is not enlarged, when the user presses a flash/left button $15_L$, a next file in a reverse direction is displayed. If the image currently displayed is enlarged, when the user presses the flash/left button $15_L$, the display region of the enlarged image is moved to the left.

In the preview mode, if the user presses the flash/left button $15_L$, any one of the flash modes for a photographing mode is set. If the flash/left button $15_L$ is pressed is for a period of time equal to or shorter than a reference time, a next flash mode in the reverse direction is set. In other words, if the user presses the flash/left button $15_L$ for a short time, a next flash mode in the forward direction is set, and if the user presses the flash/left button $15_L$ for a long time, a next flash mode in the reverse direction is set. Therefore, even if the user mistakenly skips a desired flash mode, the desired flash mode can be set quickly and easily by pressing the flash/left button $15_L$ for a short or long time. A related algorithm will be described later with reference to FIGS. 8, 9, and 10.

In the reproducing mode, if the image currently displayed is enlarged, when the user presses a macro/down button $15_D$, the display region of the enlarged image is moved down. In the preview mode, the user may set automatic proximity focusing by pressing a macro/down button $15_D$.

In the reproducing mode, when the image currently displayed is enlarged, if the user presses a voice-memo/up button $15_U$, the display region of the enlarged image is moved up. In the preview mode, if the user presses the voice/memo/up button $15_U$, a 10 second recording is possible upon consecutive photographing.

In a setting mode from the preview mode, if the user presses a menu/select-confirm button $15_M$ when the active cursor is on a selection menu, the operation corresponding to the selection menu is performed.

The manual adjusting/reproducing/terminating button 37 is used for manual adjustment of specific conditions. In addition, when the user presses the manual adjusting/reproducing/terminating button 37, a selected moving-image file may be reproduced or its reproduction may be terminated.

The manual focusing/deleting button 36 is used for manual focusing or deleting in the photographing mode.

The monitor button 32 is used for controlling the operation of the color LCD panel 35. For example, in the photographing mode, when the user presses the monitor button 32, an image and photographing information are displayed on the color LCD panel 35. When the user presses the monitor button 32 again, the color LCD panel 35 is turned off. In the reproducing mode, when the user presses the monitor button 32 while an image file is being reproduced, photographing information about the image file is displayed on the color LCD panel 35. When the user presses the monitor button 32 again, only pure images are displayed.

The reproducing mode button 42 is used for switching between a reproducing mode and a preview mode.

The automatic focusing lamp 33 operates when a focus is well adjusted. The flash standby lamp 34 operates when the flash 12 of FIG. 1 is in a standby mode. A mode indicating lamp $14_L$ indicates a selection mode of the mode dial 14.

Figure 3:
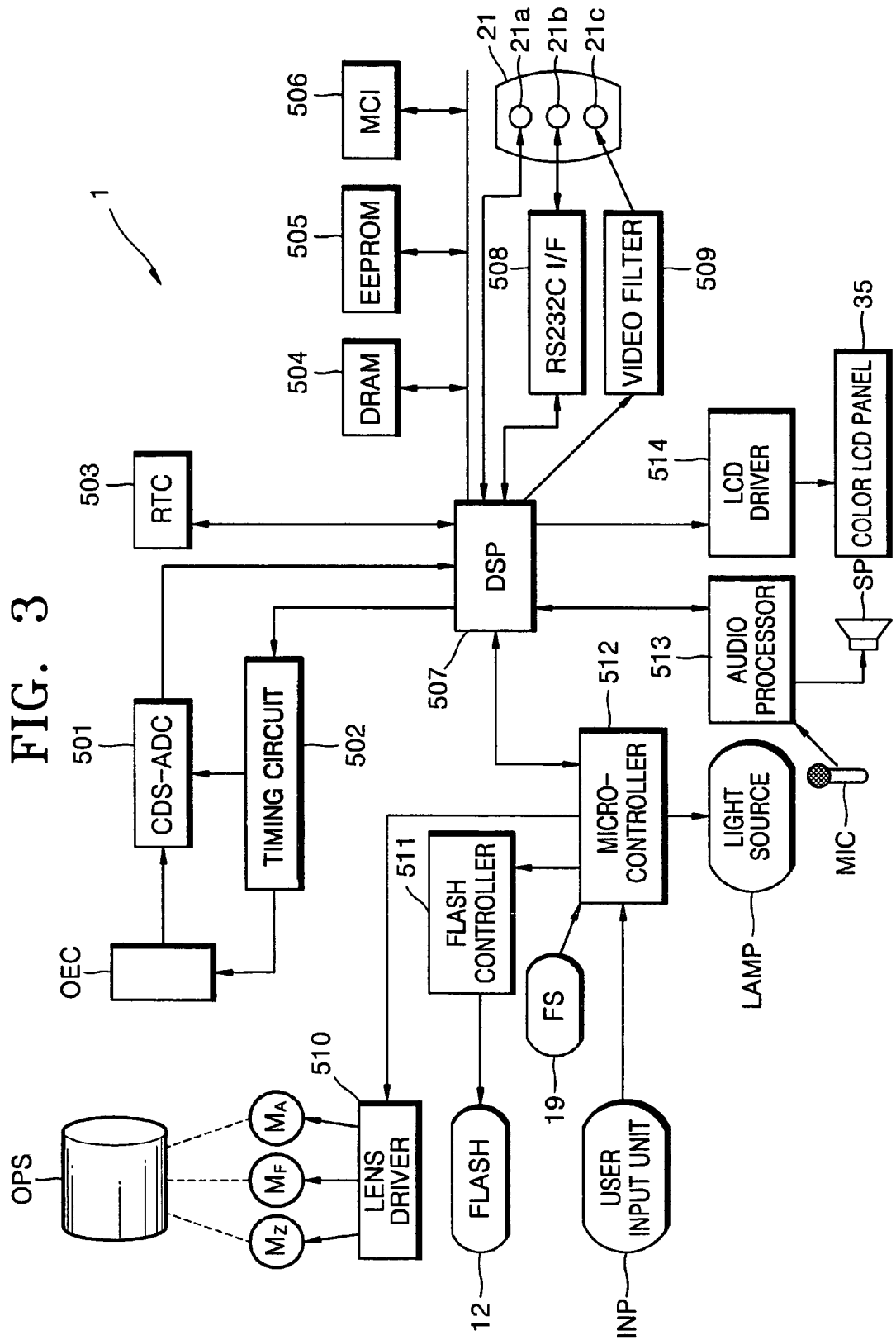
FIG. 3 is a schematic diagram of the configuration of the digital photographing apparatus of FIG. 1.

FIG. 3 is a schematic diagram of the configuration of the digital camera of FIG. 1. The configuration and operation of the digital camera 1 of FIG. 1 will now be described with reference to FIGS. 1 through 3.

An optical system (OPS) including the lens unit 20 and a filter unit optically processes light. The lens unit 20 of the OPS includes a zoom lens, a focus lens, and a compensation lens.

When the user presses the wide angle-zoom button $39_W$ or the telephoto-zoom button $39_T$ included in a user input unit (INP), a signal corresponding to the wide angle-zoom button $39_W$ or the telephoto-zoom button $39_T$ is relayed to the micro-controller 512. The micro-controller 512 controls a lens driver 510, thereby running a zoom motor $M_Z$, which in turn, moves the zoom lens. In other words, when the user presses the wide angle-zoom button $39_W$, the focal length of the zoom lens becomes short, thereby widening the angle of view. When the user presses the telephoto-zoom button $39_T$, the focal length of the zoom lens becomes long, thereby narrowing the angle of view. Since the position of the focus lens is adjusted in a state where the position of the zoom lens is set, the angle of view is hardly affected by the position of the focus lens.

In the automatic focusing mode, a main controller built into the DSP 507 controls the lens driver 510 through the micro-controller 512, thereby driving a focus motor $M_F$. Accordingly, when the focus lens is moved, the position of the focus lens having the largest high frequency component of an image signal is set. The position of the focus lens may be determined, for example, by the number of driving steps of the focus motor $M_F$.

A compensation lens in the lens unit 20 of the OPS is not separately operated because the compensation lens compensates for the entire refractive index. Reference numeral $M_A$ indicates a motor for driving an aperture (not shown).

An optical low pass filter included in the filter unit of the OPS eliminates high frequency optical noise. An infrared cut filter included in the filter unit of the OPS blocks the infrared component of incident light.

A photoelectric conversion unit (OEC) of a charge coupled device or a complementary metal oxide (CMOS) semiconductor converts light from the OPS into an analog electrical signal. Here, the DSP 507 controls a timing circuit 502 to control the operations of the OEC and a correlation-double-sampler-and-analog-to-digital converter (CDS-ADC) 501. The CDS-ADC 501 processes an analog signal from the OEC, eliminates high frequency noise, adjusts amplitude, and then converts the analog signal into a digital signal.

A real time clock (RTC) 503 provides time information to the DSP 507. The DSP 507 processes the digital signal from the CDS-ADC 501 and generates a digital image composed of luminance and chromaticity values.

A light source (LAMP) is operated by the micro-controller 512 in response to a control signal generated by the DSP 507 including the main controller. The light source (LAMP) includes the self-timer lamp 11, the automatic focusing lamp 33, the mode indicating lamp $14_L$, and the flash standby lamp 34. The INP includes the shutter release button 13, the mode dial 14, the functional buttons 15, the monitor button 32, the manual focusing/deleting button 36, the manual adjusting/reproducing/terminating button 37, the wide angle-zoom button $39_W$, and the telephoto-zoom button $39_T$, and the reproducing mode button 42.

A dynamic random access memory (DRAM) 504 temporarily stores a digital image signal from the DSP 507. An electrically erasable and programmable read only memory (EEPROM) 505 stores algorithm and setting data. A user's memory card is inserted or removed in a memory card interface (MCI) 506. The digital image signal from the DSP 507 is input to an LCD driver 514, thereby displaying an image on the color LCD panel 35.

The digital image signal from the DSP 507 can be transmitted via a universal serial bus (USB) connector 21a or via an RS232C interface 508 and an RS232C connector 21b for serial communications. The digital image signal from the DSP 507 can also be transmitted via a video filter 509 and a video output unit 21c as a video signal. Here, the DSP 507 includes the main controller.

An audio processor 513 can relay sound from the microphone MIC to the DSP 507 or to speaker SP. In addition, the audio processor 513 can output an audio signal from the DSP 507 to the speaker SP. The micro-controller 512 controls the operation of a flash controller 511 in response to a signal from the flash light intensity sensor (FS) 19, thereby driving the flash 12.

A main algorithm of the DSP 507 of FIG. 3 will be described in the following with reference to FIGS. 1 through 4.

Figure 5:
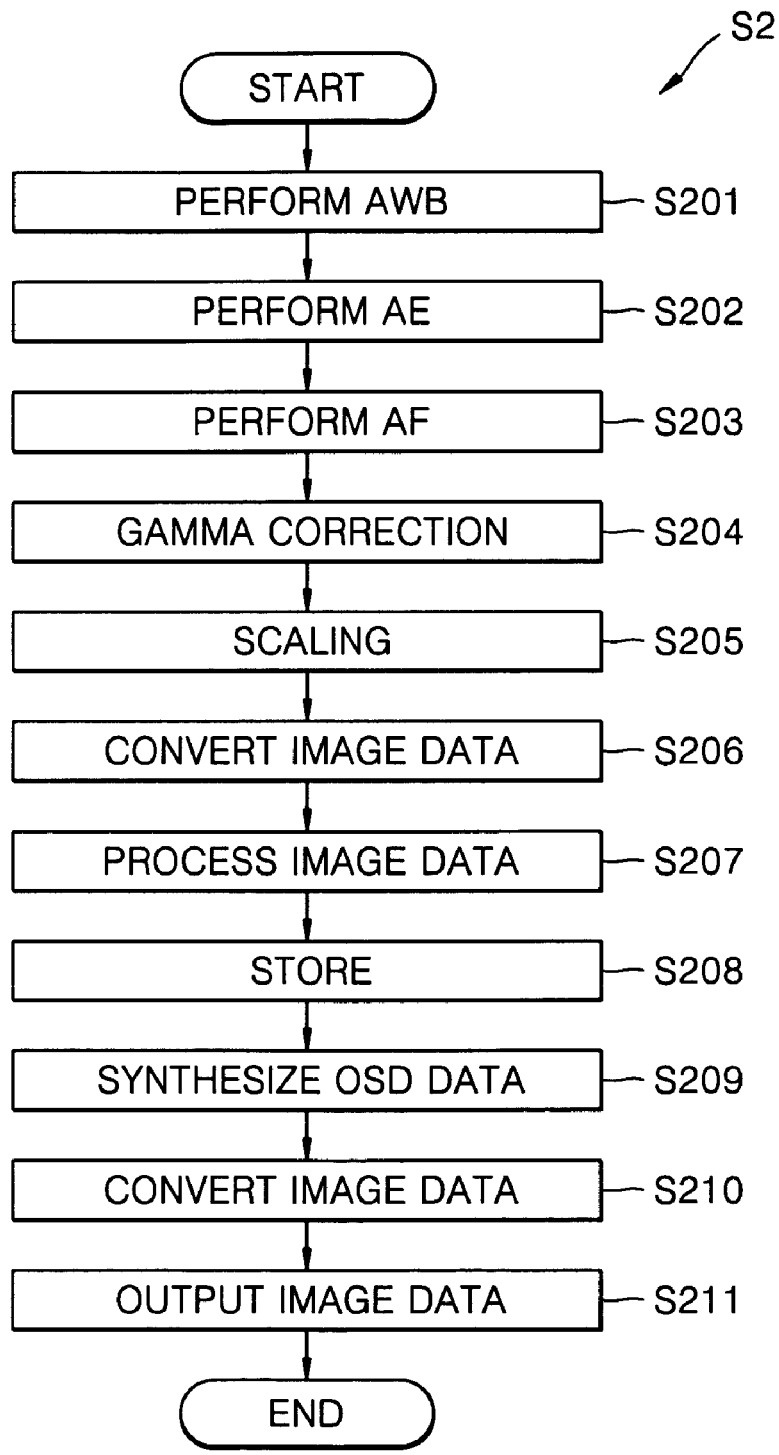
FIG. 5 is a flowchart illustrating a preview mode algorithm illustrated in FIG. 4.

When power is applied to the digital photographing apparatus 1, the DSP 507 is initialized (S1). After the initialization (S1), the DSP 507 performs a preview mode (S2). In the preview mode, an image input is displayed on the display panel 35. An operation related to the preview mode will be described in detail later with reference to FIG. 5.

When the first level signal S1 from the shutter release button 13 is on after a user pressed the shutter release button 13 to the first level, the DSP 507 identifies a current operating mode (S32). Hereinafter, a description of the recording mode will be omitted. The DSP 507 performs the still-image photographing mode or the moving-image photographing mode depending on the chosen current operation mode (Steps S41 or S42). The still-image photographing mode (S41) algorithm will be described with reference to FIG. 6. The moving-image photographing mode (S42) algorithm will be described with reference to FIG. 7.

When INP-generated signals corresponding to a setting mode are input (S5), the setting mode for setting an operating condition in response to the input signals from the INP is performed (S6). For example, in the preview mode (S2), if a flash button signal is input after the user presses the flash/left button $15_L$ (S5), the setting mode for setting one of the flash modes is performed (S6). An algorithm of the setting mode for setting a flash mode ($S6_F$ of FIG. 8) will be described later in detail with reference to FIGS. 8, 9, and 10.

When a termination signal is not generated, the DSP 507 continues to perform the following operation (S7).

When a signal is generated by the reproducing mode button 42 in the INP (S8), a reproducing mode is performed (S9). In the reproducing mode, reproducing is performed in response to input signals from the INP. The reproducing mode (S9) algorithm will be described in detail later with reference to FIG. 9. When the reproducing mode is terminated, the above operations are repeated.

The preview mode (S2) algorithm of FIG. 4 will now be described with reference to FIGS. 1 through 3 and FIG. 5.

The DSP 507 performs automatic white balancing (AWB) and sets parameters related to the white balance (S201). In the automatic exposure mode (S202), the DSP 507 calculates the exposure by measuring incident luminance, drives the aperture driving motor $M_A$ according to the calculated exposure, and sets a shutter speed (S203).

The DSP 507 performs gamma correction on input image data (S204) and scales the gamma corrected image data to meet display standards (S205). The DSP 507 converts the scaled input image data from an RGB (red, green, and blue) format into a luminance-chrominance format (S206). The DSP 507 processes the input image data depending on resolution and display location and also filters the input image data (S207).

The DSP 507 temporarily stores the input image data in the DRAM 504 of FIG. 3 (S208). The DSP 507 synthesizes the data temporarily stored in the DRAM 504 of FIG. 3 and on-screen display (OSD) data (S209). The DSP 507 converts the synthesized image data from the RGB format into the luminance-chromaticity format (S210) and outputs the image data in the converted format via the LCD driver 514 of FIG. 3 (S211).

Figure 4:
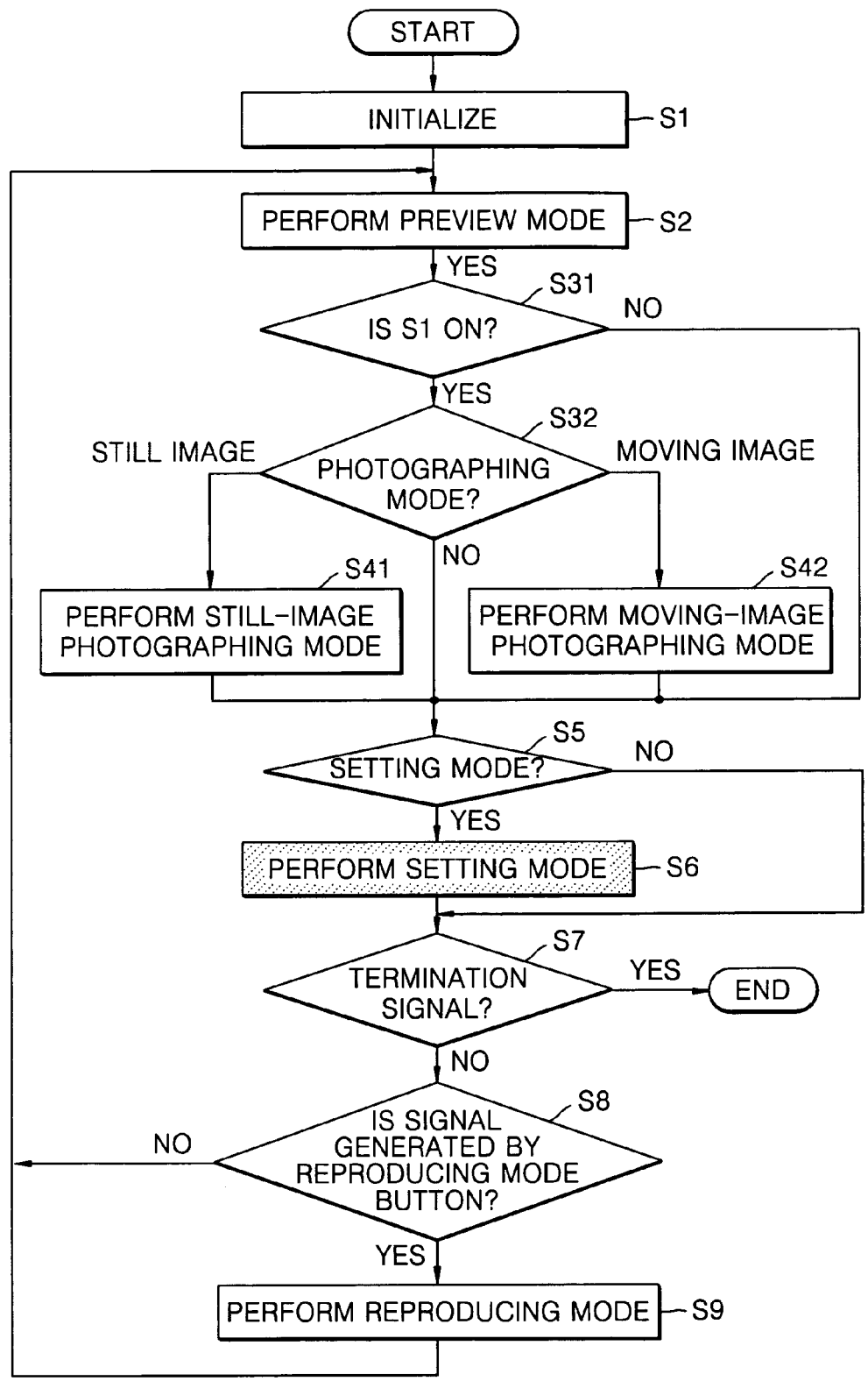
FIG. 4 is a flowchart illustrating a main algorithm of a digital signal processor (DSP) illustrated in FIG. 3.
Figure 6:
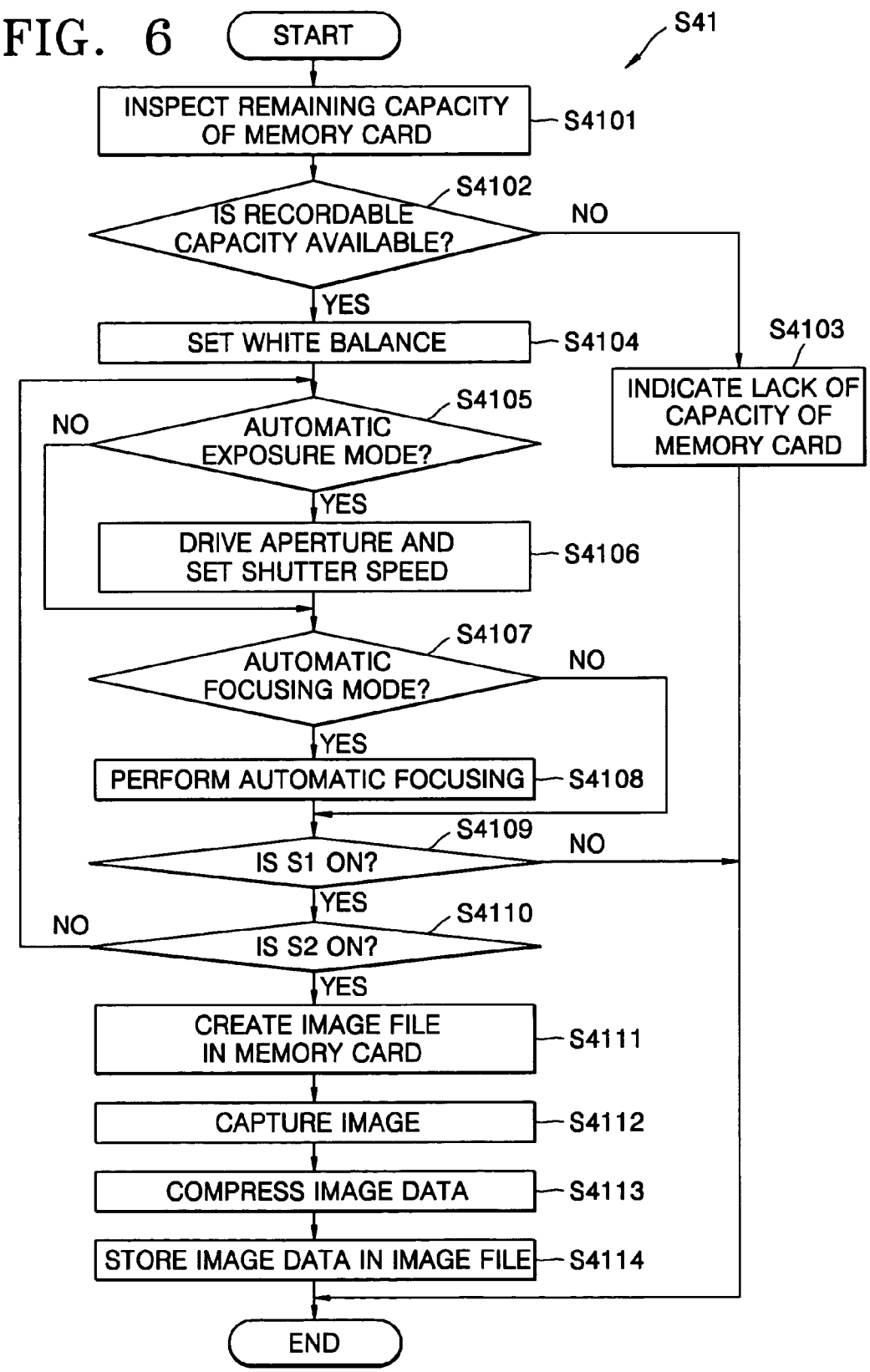
FIG. 6 illustrates a still-image photographing mode algorithm illustrated in FIG. 4.

FIG. 6 illustrates a still-image photographing mode (S41) algorithm illustrated in FIG. 4. The still-image photographing mode (S41) algorithm will now be described with reference to FIGS. 1 through 3 and FIG. 6. Here, the present position of the zoom lens is already set.

The DSP 507 inspects the remaining capacity of the memory card (S4101) and determines whether the memory card has enough capacity to store a digital image signal (S4102). If the memory card does not have enough storage capacity, the DSP 507 indicates the lack of capacity of the memory card and ends the still-image photographing mode (S4103). If the memory card has enough storage capacity, the following operations are performed.

The DSP 507 sets white balance and parameters related to the white balance according to a present photographing condition (S4104). In the automatic exposure mode (S4105), the DSP 507 calculates the exposure by measuring incident luminance, drives the aperture driving motor $M_A$ according to the calculated exposure, and sets the exposure time (S4106). In the automatic focusing mode (S4107), the DSP 507 performs automatic focusing and drives the focus lens (S4108).

When the first level signal S1 from the shutter release button 13 is on (S4109), the DSP 507 continues to perform the following steps.

The DSP 507 identifies whether the second level signal S2 is on (S4110). When the second level signal S2 is not on, it means that the user did not press the shutter release button 13 to the second level to take a photograph. Then, the DSP 507 repeats the operations S4105 through S4110.

When the second level signal S2 is on, it means that the user pressed the shutter release button 13 to the second level, and the DSP 507 creates a still-image file in the memory card (S4111). Next, the DSP 507 captures a still image (S4112). In other words, the DSP 507 receives still-image data from the CDS-ADC 501 and the DSP 507 compresses the received still-image data (S4113). The DSP 507 stores the compressed still-image data in the still-image file (S4114).

Figure 7:
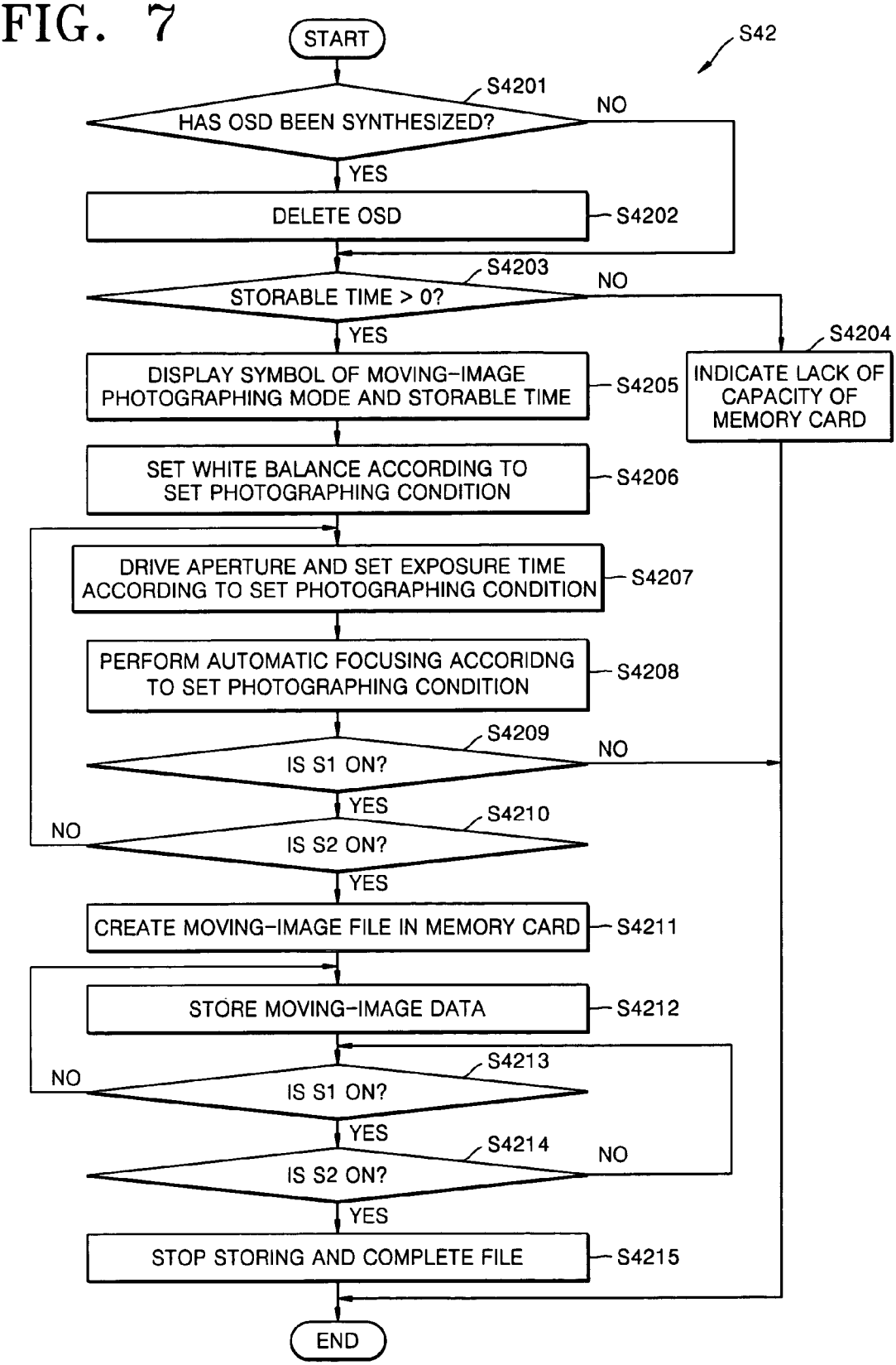
FIG. 7 is a flowchart illustrating a moving-image photographing mode algorithm illustrated in FIG. 4.

FIG. 7 is a flowchart illustrating the moving-image photographing mode (S42) algorithm illustrated in FIG. 4. The moving-image photographing mode algorithm will now be described with reference to FIGS. 1 through 3 and FIG. 7.

If an on-screen display (OSD) has been synthesized with image data being output, the DSP 507 deletes the OSD data (S4201 and S4202).

The DSP 507 inspects the remaining capacity of the memory card and determines whether a storable time for storing digital moving-image data is present (S4203). When the memory card does not have enough storage capacity, the DSP 507 indicates the lack of capacity of the memory card (S4204). When the memory card has enough storage capacity, the following operations are performed.

The DSP 507 displays a symbol of the moving-image photographing mode and storable time on the LCD panel 35 (S4205).

The DSP 507 sets a white balance and parameters related to the white balance according to a set photographing condition (S4206). Then, the DSP 507 performs the automatic exposure mode according to the set photographing condition (S4207). In other words, the DSP 507 calculates the exposure by measuring incident luminance, drives the aperture driving motor $M_A$ according to the calculated exposure, and sets exposure time. The DSP 507 performs automatic focusing according to the set photographing condition and drives the focus lens (S4208).

When the first level signal S1 from the shutter release button 13 is on (S4209), the DSP performs the following operations.

The DSP 507 determines whether the second level signal S2 is on (S4210). When the second level signal S2 is not on, it means that the user did not press the shutter release button 13 to the second level to take a photograph. Therefore, the DSP 507 repeats the operations S4207 through S4210.

When the second level signal S2 is on, it means that the user pressed the shutter release button 13 to the second level. Accordingly, the DSP 507 creates a moving-image file in the memory card (S4211).

The DSP 507 compresses the moving-image data from the CDS-ADC 501 using a motion picture experts group (MPEG) compressing algorithm or a motion joint photographic experts group (MJPEG) compressing algorithm and stores the compressed data in the moving-image file (S4212).

During this process, if both the first level signal S1 and the second level signal S2 from the shutter release button 13 are on, the DSP 507 stops storing the moving-image data and sets the moving-image file (S4213 through S4215).

Figure 8:
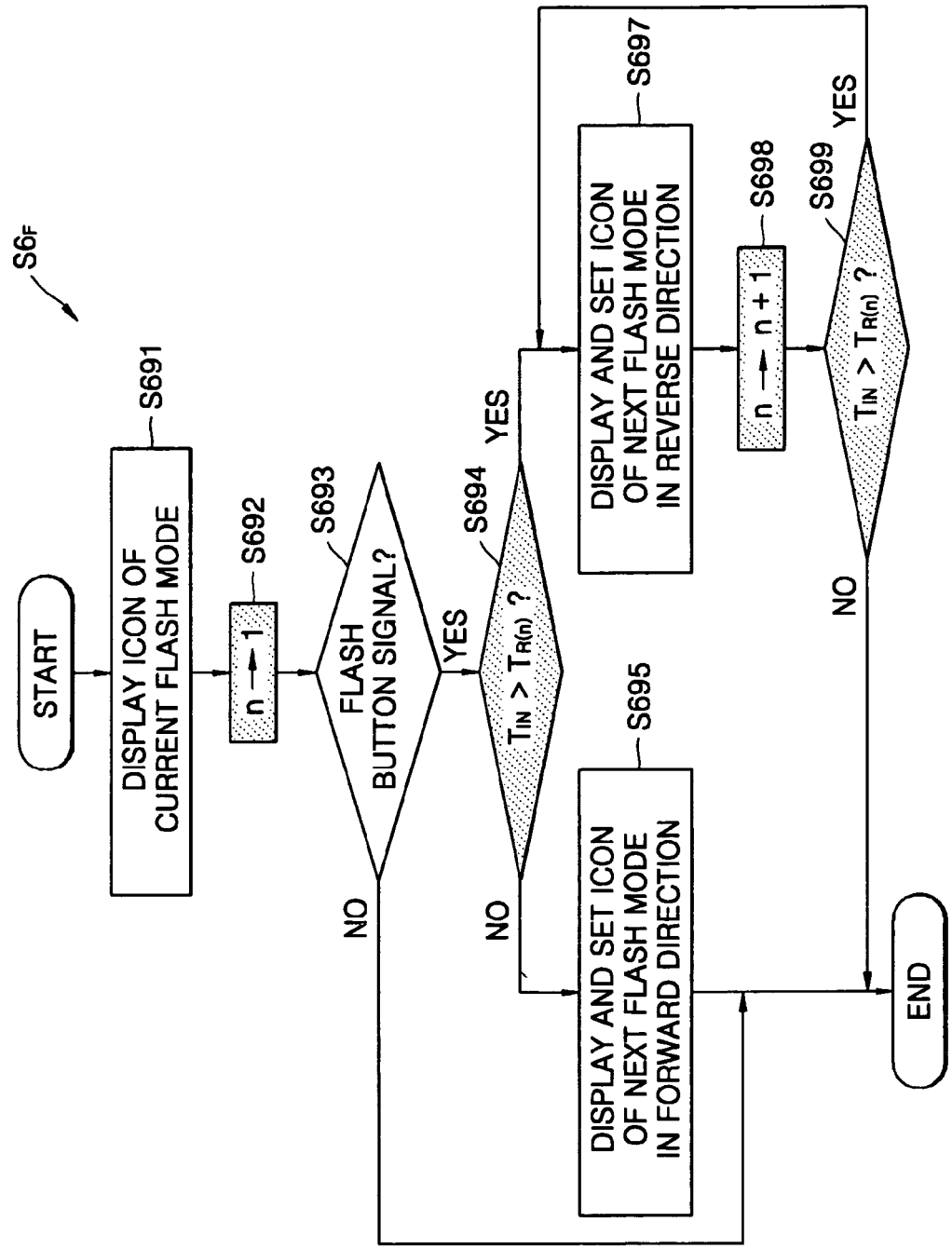
FIG. 8 is a flowchart illustrating a flash-mode setting algorithm performed when a flash/left button is pressed in operation S5 of FIG. 4 according to an embodiment of the present invention.

FIG. 8 is a flowchart illustrating a flash-mode setting algorithm (S6$_F$) when the flash/left button 15$_L$ is pressed in S5 of FIG. 4 according to an embodiment of the present invention.

Figure 9:
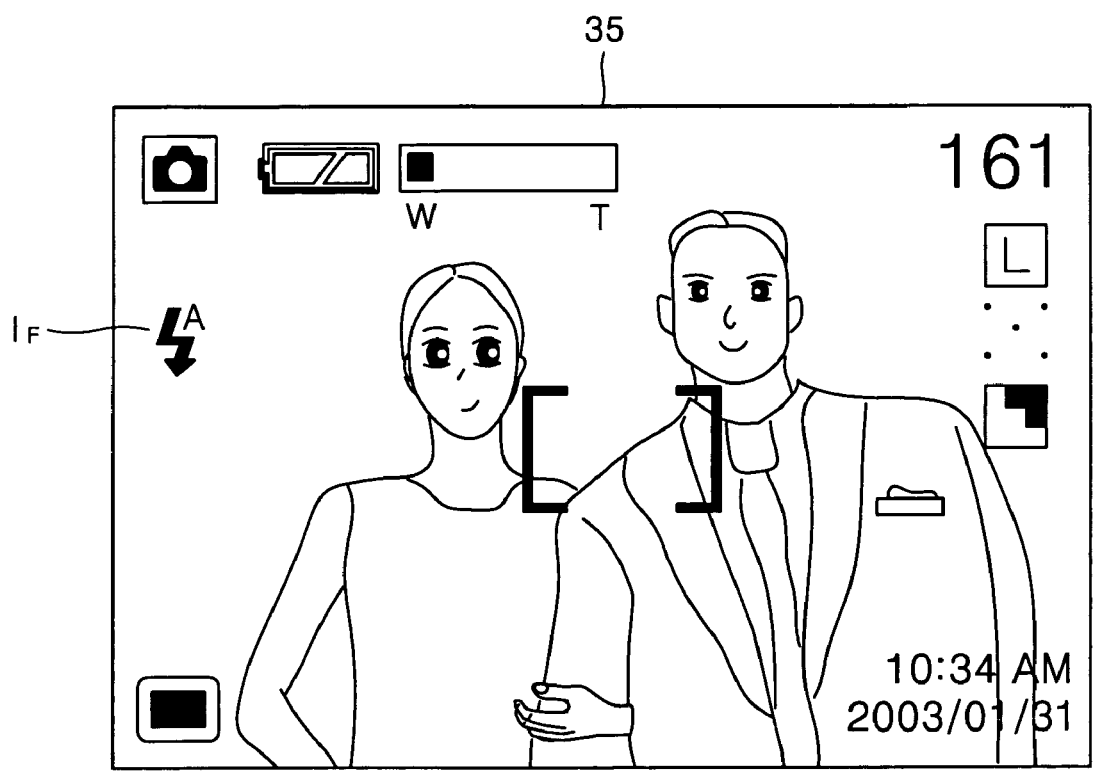
FIG. 9 is a color LCD panel displaying an icon of a flash mode currently set as a result of performing operation S691 illustrated in FIG. 8.
Figure 10:
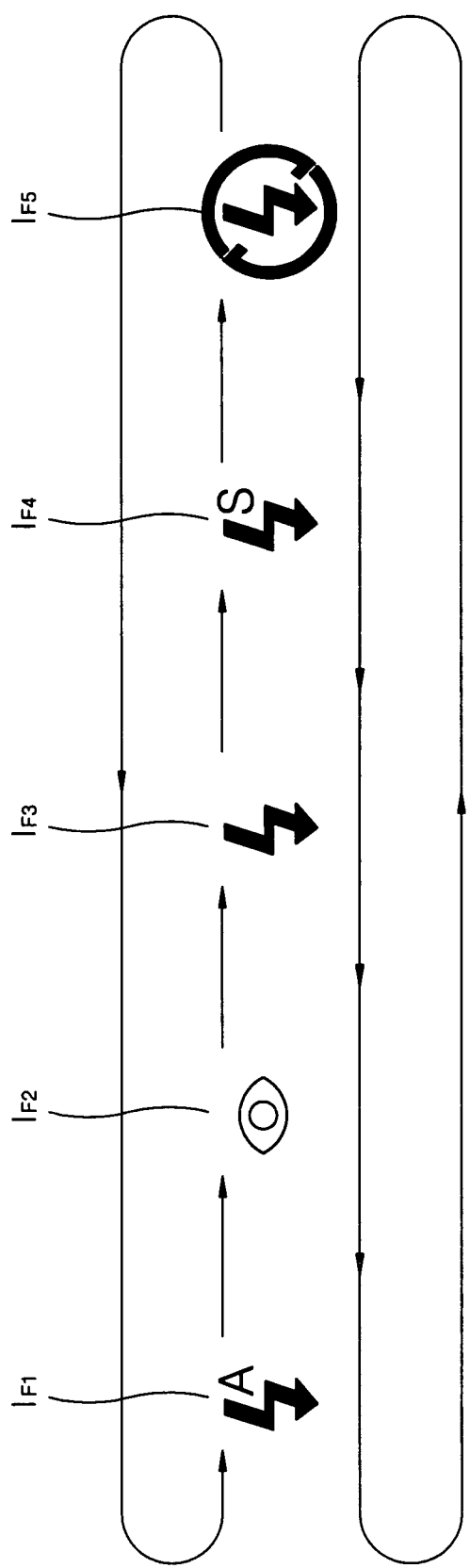
FIG. 10 summarizes the flash mode setting algorithm of FIG. 8.
Figure 11:
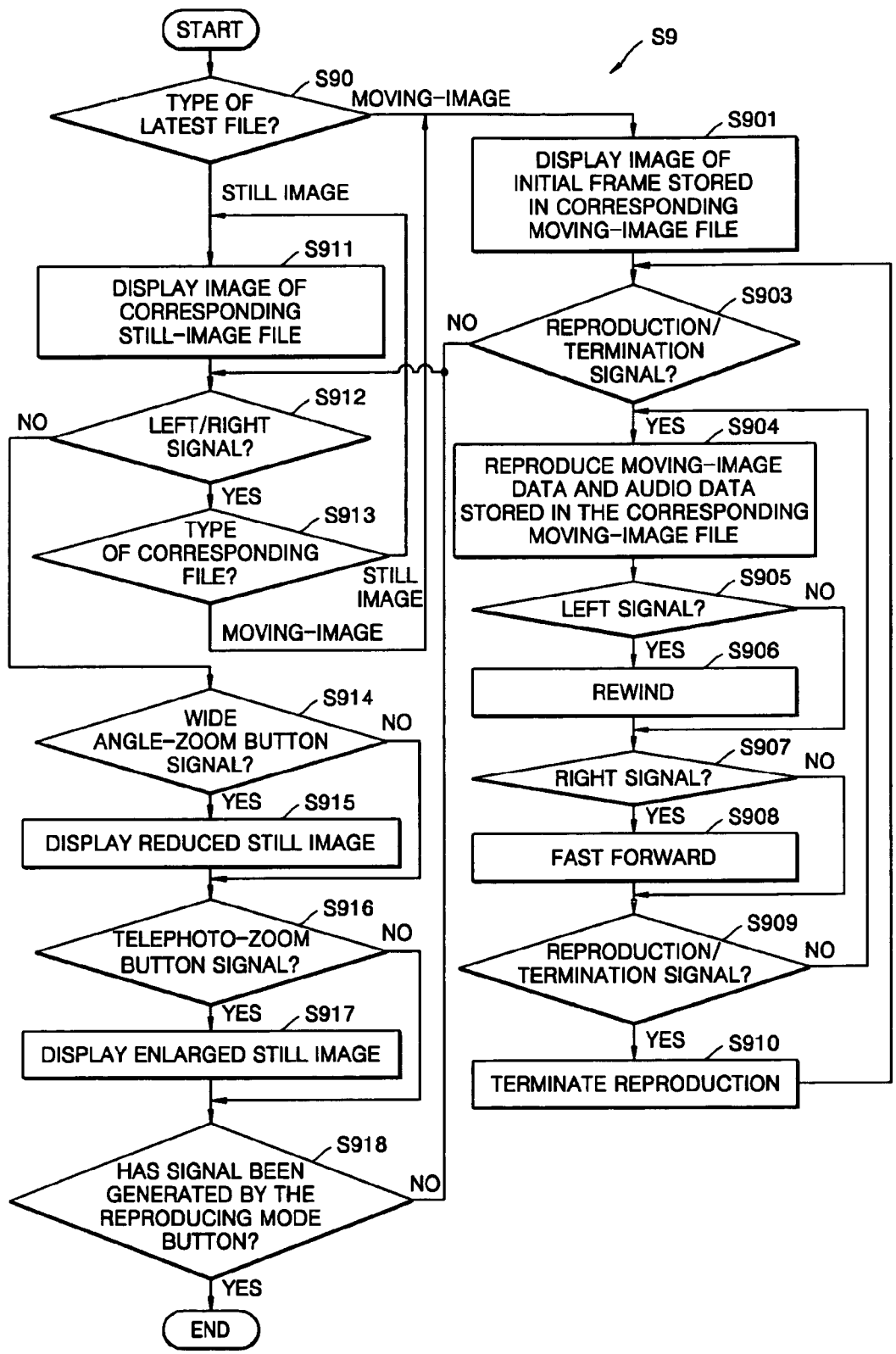
FIG. 11 is a flowchart illustrating a reproducing mode algorithm illustrated in FIG. 4.

FIG. 9 is the color LCD panel 35 displaying an icon $I_F$ of a flash mode currently set as a result of performing S691 illustrated in FIG. 8. FIG. 10 summarizes the flash mode setting algorithm (S6$_F$) of FIG. 8.

In FIG. 10, $I_{F1}$ indicates an icon of an automatic flash mode, $I_{F2}$ indicates an icon of a preliminary flash mode, $I_{F3}$ indicates an icon of a constant flash mode, $I_{F4}$ indicates an icon of a slow-synchro flash mode, and $I_{F5}$ indicates an icon of a flash-off mode. If the automatic flash mode (indicated by $I_{F1}$) is set, the DSP 507 controls an operation of the flash 12 according to the intensity of illumination in the surrounding area. If the preliminary flash mode (indicated by $I_{F2}$) is set, the DSP 507 controls the operation of the flash 12 according to the intensity of illumination in the surrounding area and, when the flash 12 is turned on, the flash 12 fires preliminary and main flashes consecutively, thereby preventing red eye.

If the constant flash mode (indicated by $I_{F3}$) is set, whenever the shutter release button 13 is pressed, the DSP 507 turns the flash 12 on regardless of the intensity of illumination in the surrounding area. If the flow-synchro flash mode (indicated by $I_{F4}$) is set, the DSP 507 controls the operation of the flash 12 according to the intensity of illumination in the surrounding area and, when the flash 12 is turned on, has a longer exposure to lighten the background. Photographing in the slow-synchro flash mode may be greatly affected by shaking caused by pressing the shutter release button 13. Thus, the slow-synchro flash mode (indicated by $I_{F4}$) and the self-timer mode may be set together. If the flash-off mode (indicated by $I_{F5}$) is set, the DSP 507 keeps the flash 12 off.

The flash-mode setting algorithm (S6$_F$) will now be described with reference to FIGS. 1 through 3 and 8 through 10. The DSP 507 controls the LCD driver 514 to display an icon $I_F$ of a flash mode currently set on the color LCD panel 35 (S691). FIG. 9 illustrates the color LCD panel 35 displaying a screen when the automatic flash mode (indicated by $I_{F1}$) is set. Next, a variable n is set to "1" (S692).

If the flash button signal is generated after a user presses the flash/left button 15$_L$ (S693), the DSP 507 determines whether an input time $T_{IN}$ of the flash button signal is longer than a set reference time $T_{R(n)}$ (S694). The reference time $T_{R(n)}$ is set according to the variable n. For example, if the variable n is in a range of "1" through "10," $T_{R(1)}$ is set to 0.5 seconds, $T_{R(2)}$ to 1 second, $T_{R(3)}$ to 1.5 seconds, $T_{R(4)}$ to two seconds, $T_{R(5)}$ to 2.5 seconds, $T_{R(6)}$ to three seconds, $T_{R(7)}$ to 3.5 seconds, $T_{R(8)}$ to four seconds, $T_{R(9)}$ to 4.5 seconds, and $T_{R(10)}$ to five seconds.

If the time when the flash/left button 15$_L$ is pressed by the user, that is, the input time $T_{IN}$ of the flash button signal, is equal to or shorter than the reference time $T_{R(n)}$, the DSP 507 controls the LCD driver 514 to display an icon of a next flash mode in the forward direction (indicated by upper arrows in FIG. 10) on the color LCD panel 35 and sets the flash mode indicated by the displayed icon (S695). If the length of time when the flash/left button 15$_L$ is pressed by the user, that is, the input time $T_{IN}$ of the flash button signal, is longer than the reference time $T_{R(n)}$, the DSP 507 controls the LCD driver 514 to display an icon of a next flash mode in the reverse direction (indicated by lower arrows in FIG. 10) on the color LCD panel 35 and sets the flash mode indicated by the displayed icon (S697).

The variable n is reset by adding "1" to the current variable n (S698). Then, it is determined whether the input time $T_{IN}$ of the flash button signal is longer than the reference time $T_{R(n)}$ (S699). If the input time $T_{IN}$ of the flash button signal is longer than the reference time $T_{R(n)}$, S697 and S698 are repeated until the input time $T_{IN}$ of the flash button signal becomes the same as the reference time $T_{R(n)}$ (S699). Accordingly, the user can set a desired flash mode by continuously pressing the flash/left button $15_L$ to view icons $I_{F1}$ through $I_{F5}$ in the reverse direction until an icon of the desired flash mode is displayed on the color LCD panel 35.

In summary, if the user presses the flash/left button $15_L$ for a short time, a next flash mode in the forward direction is set, and if the user presses the flash/left button $15_L$ for a long time, a next flash mode in the reverse direction is set. Therefore, even if the user mistakenly skips over a desired flash mode, the desired flash mode can be set quickly and easily by pressing the flash/left button $15_L$ for a short or long time.

The reproducing mode (S9) algorithm of FIG. 4 will now be described with reference to FIGS. 1 through 3 and 11. The DSP 507 identifies the type of a latest file created in the memory card (S90). If the type of the latest file created in the memory card is a still image, the DSP 507 transmits data of the still-image file to the LCD driver 514. Accordingly, the LCD panel 35 displays the still-image (S911).

After S911, if a left or right signal is not generated by a left or right functional button 15 (S912), the DSP 507 performs the following steps. If a signal is generated by the wide angle-zoom button $39_W$ (S914), the DSP 507 transmits data of a still-image reduced from its displayed image to the LCD driver 514. Accordingly, the color LCD panel 35 displays the reduced still-image (S915). Conversely, if a signal is generated by the telephoto-zoom button $39_T$ (S916), the DSP 507 transmits data of a still-image enlarged from its displayed image to the LCD driver 514. Accordingly, the color LCD panel 35 displays the enlarged still-image (S917).

If a signal is not generated by the reproducing mode button 42, S912 and its following operations are performed, and, if generated, the reproducing mode (S9) is terminated (S918).

After operation S911, if the left or right signal is generated by the left or right functional button 15 (S912), the DSP 507 identifies the type of a file corresponding to the generated signal (S913).

In operation S913, if the type of the file is a still image, the DSP 507 performs the operations S911, S912, and S913. On the other hand, in operations S90 and S913, if the type of the file is a moving-image, the DSP 507 performs the following operations.

The DSP 507 transmits an image of an initial frame in a corresponding moving-image file to the LCD driver 514. Accordingly, the color LCD panel 35 displays the image of the initial frame as a representative image of the moving-image file (S901). While the representative image is displayed, if a reproduction/termination signal is not generated after the user pressed the manual adjusting/reproducing/terminating button 37 (S903), the DSP 507 performs operation S912 and subsequent operations.

While the representative image is displayed, if the user presses the manual adjusting/reproducing/terminating button 37 (S903), thus generating the reproduction/termination signal, the DSP 507 performs the following operations.

Moving-image data and audio data stored in the moving-image file are transmitted to the LCD driver 514 and the audio processor 513, respectively, and reproduced (S904).

If the left signal is generated when the left button is pressed (S905), the DSP 507 performs rewind (S906). Similarly, if the right signal is generated when the right button is pressed (S907), the DSP 507 performs fast-forward (S908).

If the reproduction/termination signal is not generated after the user pressed the manual-adjusting/reproducing/terminating button 37 (S909), the DSP 507 performs operation S904 and subsequent operations.

If the reproduction/termination signal is generated after the user pressed the manual-adjusting/reproducing/terminating button 37 (S909), the DSP 507 terminates the reproduction (S910) and performs S903 and subsequent operations.

FIG. 12 is a flowchart illustrating a flash-mode setting algorithm ($S6_F$) when the flash/left button $15_L$ is pressed in S5 of FIG. 4 according to another embodiment of the present invention. The flash-mode setting algorithm ($S6_F$) will now be described with reference to FIGS. 1 through 3, 9, and 12.

The DSP 507 controls the LCD driver 514 to display an icon $I_F$ of a flash mode currently set on the color LCD panel 35 (S121). FIG. 9 illustrates the color LCD panel 35 displaying the screen when the automatic flash mode (indicated by $I_{F1}$) is set.

If the flash button signal as a first setting signal is generated after the user pressed the flash/left button $15_L$ (S122), the DSP 507 determines whether a second setting signal including the first setting signal is generated (S123). In other words, the DSP 507 determines whether a menu/select-confirm button signal is generated after the user pressed the menu/select-confirm button $15_M$ (S123).

If the menu/select-confirm button signal is not generated, the DSP 507 controls the LCD driver 514 to display an icon of a next flash mode in the forward direction (indicated by the upper arrows in FIG. 10) on the color LCD panel 35 and sets the flash mode indicated by the displayed icon. If generated, the DSP 507 controls the LCD driver 514 to display an icon of a next flash mode in the reverse direction (indicated by the lower arrows in FIG. 10) on the color LCD panel 35 and sets the flash mode indicated by the displayed icon (S125).

As described above, according to a control method for a digital photographing apparatus and a digital photographing apparatus using the method, a user may set a next operating mode in a forward or reverse direction using a flash/left button $15_L$. Therefore, even if the user mistakenly skips a desired flash mode, the desired flash mode can be set quickly and easily by pressing the flash/left button $15_L$.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling selection of an operating mode of a digital photographing apparatus, the method comprising:
   associating at least three cyclically and sequentially selectable operating modes comprising a first, a second, and a third operating mode with a button capable of transmitting a setting signal to a controller of the digital photographing apparatus;
   pressing the button to set the first operating mode of the operating modes associated with the button;
   changing to the second operating mode from the first operating mode in a forward direction if a first setting signal is generated; and
   changing to the third operating mode from the first operating mode in a reverse direction if a second setting signal different from the first setting signal is generated.

2. The method of claim 1, wherein:
   pressing the button for a period of time equal to or shorter than a set reference time causes the generation of the first setting signal; and
   pressing the button for a period of time that exceeds the set reference time causes the generation of the second setting signal.

3. The method of claim 2, wherein an icon of the second operating mode is displayed if the button is pressed for a period of time equal to or shorter than the set reference time.

4. The method of claim 2, wherein an icon of the third operating mode is displayed if the button is pressed for a period of time that exceeds the set reference time.

5. The method of claim 2, wherein in the setting of the third operating mode, if the time period during which the button is pressed exceeds the set reference time, the operating modes in the reverse direction are consecutively displayed and reset at a set interval while the button remains pressed.

6. The method of claim 1, wherein:
pressing a first button causes generation of the first setting signal; and
pressing both a first button and a second button causes generation of the second setting signal.

7. The method of claim 1, wherein the operating modes are comprised of flash modes.

8. A computer program product, comprising a computer usable medium having a computer readable program code embodied therein, said computer readable program code adapted to be executed to implement a method for controlling selection of an operating mode of a digital photographing apparatus, said method comprising:
associating at least three cyclically and sequentially selectable operating modes comprising a first, a second, and a third operating mode with a button capable of transmitting a setting signal to a controller of the digital photographing apparatus;
pressing the button to set the first operating mode of the operating modes associated with the button;
changing to the second operating mode from the first operating mode in a forward direction if a first setting signal is generated; and
changing to the third operating mode from the first operating mode in a reverse direction if a second setting signal different from the first setting signal is generated.

9. The computer program product of claim 8, wherein:
the first setting signal is generated when a user presses a button for a time period which is shorter than or equal to a set reference time; and
the second setting signal is generated when a user presses the button for a time period which exceeds the reference time.

10. The computer program product of claim 8, wherein:
the first setting signal is generated when a first button is pressed; and
the second setting signal is generated when the first button and a second button are pressed.

11. The computer program product of claim 8, wherein:
an icon of the second operating mode is displayed if a button is pressed for a period of time equal to or shorter than a set reference time; and
an icon of the third operating mode is displayed if the button is pressed for a period of time that exceeds a set reference time.

12. The computer program product of claim 8, wherein the operating modes are comprised of flash modes.

13. A system for controlling the setting of operating modes of a digital photographing apparatus, the system comprising:
means for a digital photographing apparatus to operate in at least three operating modes, comprising a first, a second, and a third operating mode, which are available for cyclical and sequential selection by a user;
means for presenting to the user the available operating modes in both a forward and a reverse direction;
means for selecting the first operating mode from among the available operating modes;
means for changing the second operating mode from the first operating mode in a forward direction if a first setting signal is generated; and
means for changing the third operating mode from the first operating mode in a reverse direction if a second setting signal different from the first setting signal is generated.

14. The system of claim 13, wherein the means for presenting to the user the available operating modes in both a forward and a reverse direction comprises:
a means for generating a first setting signal and a second setting signal;
a display screen for displaying an operating mode icon; and
processing means for controlling the displaying of an operating mode icon.

15. The system of claim 14, wherein the means for generating a first and a second setting signal comprises:
a button capable of transmitting a setting signal to the processing means.

16. The system of claim 15, wherein:
the first setting signal is generated if the button is pressed for a period of time less than or equal to a set reference time; and
the second setting signal is generated if the button is pressed for a period of time exceeding the set reference time.

17. The system of claim 14, wherein the means for generating a first and a second setting signal comprises:
a first button capable of transmitting a first setting signal to the processing means; and
a second button capable of transmitting a second setting signal to the processing means.

18. The system of claim 14, wherein the processing means for controlling the displaying of an operating mode icon:
cause the display of a next operating mode icon in the forward direction if the processing means receives a first setting signal; and
cause the display of a next operating mode icon in the reverse direction if the processing means receives a second setting signal including the first setting signal.

19. The system of claim 13, wherein the means for selecting the first operating mode from among the available operating modes comprises a confirmation button which is capable of transmitting a confirmation signal.

* * * * *